(12) United States Patent
Schindler

(10) Patent No.: US 11,995,857 B2
(45) Date of Patent: May 28, 2024

(54) SHAPE-FROM-SHADING

(71) Applicant: TRINAMIX GMBH, Ludwigshafen am Rhein (DE)

(72) Inventor: Patrick Schindler, Ludwigshafen am Rhein (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 0 days.

(21) Appl. No.: 18/363,437

(22) Filed: Aug. 1, 2023

(65) Prior Publication Data

US 2024/0013416 A1   Jan. 11, 2024

Related U.S. Application Data

(63) Continuation of application No. PCT/EP2022/073340, filed on Aug. 22, 2022.

(30) Foreign Application Priority Data

Aug. 23, 2021 (EP) ..................... 21192632

(51) Int. Cl.
*G06K 9/00* (2022.01)
*G06T 7/586* (2017.01)
*G06V 10/60* (2022.01)

(52) U.S. Cl.
CPC .............. *G06T 7/586* (2017.01); *G06V 10/60* (2022.01)

(58) Field of Classification Search
CPC ...... G06V 20/00; G06V 20/60; G06V 10/145; G06V 10/60; G01B 7/26; G01B 11/22;
(Continued)

(56) References Cited

U.S. PATENT DOCUMENTS

2018/0033146 A1* 2/2018 Bleyer ............... G01B 11/2513
2019/0339369 A1* 11/2019 Fenton ................... G06T 7/001
(Continued)

FOREIGN PATENT DOCUMENTS

WO   2021/105265 A1   6/2021
WO   2021/152070 A1   8/2021

OTHER PUBLICATIONS

Ha et al., "Dense Depth and Albedo from a Single-Shot Structured Light", IEEE, 2015 International Conference on 3D Vision, pp. 127-134 (2015).
(Continued)

*Primary Examiner* — Shervin K Nakhjavan
(74) *Attorney, Agent, or Firm* — Armstrong Teasdale LLP

(57) ABSTRACT

A method for determining a depth map of at least one object, the method including:
a) illuminating a scene including the object by using at least one flood light source; and imaging at least one pixelated flood image of the scene by using at least one camera;
b) projecting at least one illumination pattern on the scene by using at least one projector and imaging at least one pixelated reflection image using the at least one camera;
c) evaluating the flood image by using at least one evaluation device thereby determining reflectance R(x) for each pixel position x of the flood image;
d) evaluating the reflection image by using the evaluation device;
e) assigning and extrapolating with the evaluation device; and
f) determining the depth map with the evaluation device.

25 Claims, 3 Drawing Sheets

(58) Field of Classification Search
CPC ............... G01B 13/14; G01B 11/2518; G06T 2207/10028; G06T 7/521; G06T 7/50; G06T 7/586; G06T 15/80; G03B 15/02; G03B 15/03
See application file for complete search history.

(56) References Cited

U.S. PATENT DOCUMENTS

2020/0386540 A1\* 12/2020 Hseih .................... G01S 7/4915
2022/0308232 A1\* 9/2022 Sun ......................... G06T 7/521

OTHER PUBLICATIONS

International Search Report and Written Opinion for corresponding, PCT/EP22/73340, dated Nov. 22, 2022, 9 pages.

\* cited by examiner

SHAPE-FROM-SHADING

CROSS-REFERENCE TO RELATED APPLICATIONS

This application is a bypass U.S. Continuation Application of International Patent Application No. PCT/EP22/73340, filed Aug. 22, 2022, which claims priority to European Patent Application No. 21192632.4, filed Aug. 23, 2021, each of which is hereby incorporated by reference herein.

FIELD OF THE INVENTION

The invention relates to a method for determining a depth map, a detector and various uses of the detector. The devices, methods and uses according to the present invention specifically may be employed for example in various areas of daily life, security technology, gaming, traffic technology, production technology, photography such as digital photography or video photography for arts, documentation or technical purposes, safety technology, information technology, agriculture, crop protection, maintenance, cosmetics, medical technology or in the sciences. However, other applications are also possible.

PRIOR ART

Shape-from-shading (SfS) is a well-known method in computer vision to determine 3D depth information from one or more 2D images. The information of the light incidence and the shadow cast is used for this method. The first shape-from-shading problems have already been described in B. Horn. Obtaining shape-from-shading information. In P. Winston, editor, The Psychology of Computer Vision. McGraw-Hill, New York, 1975. It tries to reconstruct the 3D shape from a single image. The image shows an object with a homogeneous material (constant albedo). The object is illuminated with one light source. However, the position of the light source is known. With the assumption of the known reflection behavior, for example a Lambertian reflector. The model of the shading can be easily determined by using a Lambertian reflector model, i.e. reflectance $R = A \cdot \langle n, l \rangle$, with A being the albedo, n being the normal field and l being the light direction.

Calculating the reflectance from a given 3D shape is straightforward. The normal vectors are calculated from the 3D shape and then the reflectance is easily determined if the albedo is known. However, shape-from-shading tries to invert this problem. The incoming image contains the reflectance information and from this the 3D shape must be determined. There are various approaches to solve this problem, e.g. via differential equations, optimization approaches and much more.

In practice, a global constant albedo estimate is not useful. Thereby arbitrary scenes have also arbitrary objects with different albedos. The difficulty for shape-from-shading is to estimate the 3D shape and the albedo. This is very difficult and not unique solvable. The problem can be simplified if several images are taken with different light sources. But a shape-from-shading with one reflectance image is simply hard. For example, no one can tell if the shape of the object is changing, or if the object is simply going dark. The problem remains ill posed.

Problem Addressed by the Invention

It is therefore an object of the present invention to provide devices and methods facing the above-mentioned technical challenges of known devices and methods. Specifically, it is an object of the present invention to provide devices and methods which allow reliable depth measurement with a low technical effort and with low requirements in terms of technical resources and cost.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such a way with other optional or non-optional features of the invention.

In a first aspect of the present invention, a method for determining a depth map of at least one object is disclosed.

The term "depth" or depth information, as used herein, is a broad term and is to be given its ordinary and customary meaning to a person of ordinary skill in the art and is not to be limited to a special or customized meaning. The term specifically may refer, without limitation, to a relative distance between a surface point of the object and the camera and/or a relative surface height at that point above an x-y plane. The depth may be given by the longitudinal coordinate z. The term "depth map" as used herein, is a broad term and is to be given its ordinary and customary meaning to a person of ordinary skill in the art and is not to be limited to a special or customized meaning. The term specifically may refer, without limitation, to a spatial distribution of depth.

The method steps may be performed in the given order or may be performed in a different order. Further, one or more additional method steps may be present which are not listed. Further, one, more than one or even all of the method steps may be performed repeatedly. For details, options and definitions, reference may be made to the display device as discussed above. Thus, specifically, as outlined above, the method may comprise using the display device according to the present invention, such as according to one or more of the embodiments given above or given in further detail below.

The method comprises the following steps:
a) illuminating a scene comprising the object by using at least one flood light source, wherein the illumination from the flood light source has a predefined and/or predetermined light direction, imaging at least one pixelated flood image of the scene by using at least one camera;
b) projecting at least one illumination pattern on the scene by using at least one projector and imaging at least one pixelated reflection image using the camera, wherein the reflection image comprises a plurality of reflection features generated by the scene in response to the illumination pattern, wherein each of the reflection features comprises a beam profile;
c) evaluating the flood image by using at least one evaluation device thereby determining reflectance R(x) for each pixel position x of the flood image;
d) evaluating the reflection image by using the evaluation device, wherein the evaluation comprises, for each reflection feature, determining depth information by analysis of its respective beam profile and determining at least one physical light property A(x) for the respective pixel position x of the reflection image;
e) the evaluation device, assigning, for each reflection feature, the determined depth information and the determined physical light property A(x) to a corresponding pixel of the flood image and extrapolating the determined depth information and the determined physical light property A(x) to similar pixels of the flood image around said corresponding pixel;
f) the evaluation device, determining the depth map by using a shape-from-shading technique considering the determined reflectance R(x), the determined depth information and the determined physical light property A(x).

As used herein, the term "object" may refer to an arbitrary object, in particular a surface or region, which is configured to reflect at least partially at least one light beam impinging on the object. The light beam may originate from the projector and/or flood light source illuminating the object, wherein the light beam is emitted e.g. reflected or scattered by the object. The object may be an arbitrary object to be measured such as a living or non-living object.

The term "scene" as used herein, is a broad term and is to be given its ordinary and customary meaning to a person of ordinary skill in the art and is not to be limited to a special or customized meaning. The term specifically may refer, without limitation, to may refer to at least one arbitrary object or spatial region. The scene may comprise the at least one object and a surrounding environment.

The term "flood light source" as used herein, is a broad term and is to be given its ordinary and customary meaning to a person of ordinary skill in the art and is not to be limited to a special or customized meaning. The term specifically may refer, without limitation, to at least one arbitrary device adapted to provide the at least one illumination light beam for illumination of the scene. The flood light source may be configured for scene illumination. As used herein, the term "scene illumination" may refer to diffuse and/or uniform illumination of the scene. The flood light source may be adapted to directly or indirectly illuminating the scene, wherein the illumination is reflected or scattered by surfaces of the scene and, thereby, is at least partially directed towards the camera. The flood light source may be adapted to illuminate the scene, for example, by directing a light beam towards the scene, which reflects the light beam. The flood light source may be configured for generating an illuminating light beam for illuminating the scene.

The flood light source may comprise at least one light-emitting-diode (LED). The flood light source may illuminate the scene, such as a face, with the LED and, in particular, without the illumination pattern, and the camera may be configured for capturing a two-dimensional image of the scene. The flood light source may comprise a single light source or a plurality of light sources. As an example, the light emitted by the flood light source may have a wavelength of 300 to 1100 nm, especially 500 to 1100 nm. Additionally or alternatively, light in the infrared spectral range may be used, such as in the range of 780 nm to 3.0 µm. Specifically, the light in the part of the near infrared region where silicon photodiodes are applicable specifically in the range of 700 nm to 1100 nm may be used. The flood light source may be configured for emitting light at a single wavelength. Specifically, the wavelength may be in the near infrared region. In other embodiments, the flood light source may be adapted to emit light with a plurality of wavelengths allowing additional measurements in other wavelengths channels.

The illumination from the flood light source has a predefined and/or predetermined light direction. For example, the light direction may be predefined by aligning the flood light source. Additionally or alternatively, the light direction may be measured during at least one calibration step.

The projector and flood light source may constitute a coordinate system, wherein a longitudinal coordinate is a coordinate along the optical axis. The coordinate system may be a polar coordinate system in which the optical axis forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate z. Any direction perpendicular to the z-axis may be considered a transversal direction, and the polar coordinate and/or the polar angle may be considered a transversal coordinate. As used herein, the term "depth information" may relate to the longitudinal coordinate and/or information from which the longitudinal coordinate can be derived.

The term "projector" as used herein, is a broad term and is to be given its ordinary and customary meaning to a person of ordinary skill in the art and is not to be limited to a special or customized meaning. The term specifically may refer, without limitation, to at least one illumination device configured for providing the at least one illumination pattern.

The projector may be or may comprise at least one light source or at least one multiple beam light source. For example, the projector may comprise at least one laser source and one or more diffractive optical elements (DOEs). Specifically, the projector may comprise at least one laser and/or laser source. Various types of lasers may be employed, such as semiconductor lasers, double heterostructure lasers, external cavity lasers, separate confinement heterostructure lasers, quantum cascade lasers, distributed bragg reflector lasers, polariton lasers, hybrid silicon lasers, extended cavity diode lasers, quantum dot lasers, volume Bragg grating lasers, Indium Arsenide lasers, transistor lasers, diode pumped lasers, distributed feedback lasers, quantum well lasers, interband cascade lasers, Gallium Arsenide lasers, semiconductor ring laser, extended cavity diode lasers, or vertical cavity surface-emitting lasers. Additionally or alternatively, non-laser light sources may be used, such as LEDs, micro-light emitting diode (LED), and/or light bulbs. The projector may comprise one or more diffractive optical elements (DOEs) configured for generating the illumination pattern. For example, the projector may be adapted to generate and/or to project a cloud of points, for example the projector source may comprise one or more of at least one digital light processing projector, at least one LCoS projector, at least one spatial light modulator; at least one diffractive optical element; at least one array of light emitting diodes; at least one array of laser light sources. On account of their generally defined beam profiles and other properties of handleability, the use of at least one laser source is particularly preferred. The projector and the flood light source may be integrated into a housing.

Further, the projector may be configured for emitting modulated or non-modulated light. In case a plurality of light sources is used, the different light sources may have different modulation frequencies which, as outlined in further detail below, later on may be used for distinguishing the light beams.

The light beam or light beams generated by the projector generally may propagate parallel to the optical axis or tilted with respect to the optical axis, e.g. including an angle with the optical axis. The projector may be configured such that the light beam or light beams propagates from the projector towards the scene along an optical axis. For this purpose, the projector may comprise at least one reflective element, preferably at least one prism, for deflecting the illuminating light beam onto the optical axis. As an example, the light beam or light beams, such as the laser light beam, and the optical axis may include an angle of less than 10°, preferably less than 5° or even less than 2°. Other embodiments, however, are feasible. Further, the light beam or light beams may be on the optical axis or off the optical axis. As an example, the light beam or light beams may be parallel to the optical axis having a distance of less than 10 than 10 mm to the optical axis, preferably less than 5 mm to the optical axis or even less than 1 mm to the optical axis or may even coincide with the optical axis.

As used herein, the term "at least one illumination pattern" refers to at least one arbitrary pattern comprising at least one illumination feature adapted to illuminate at least one part of the scene. As used herein, the term "illumination feature" refers to at least one at least partially extended feature of the pattern. The illumination pattern may comprise a single illumination feature. The illumination pattern may comprise a plurality of illumination features. The illumination pattern may be selected from the group consisting of: at least one point pattern; at least one line pattern; at least one stripe pattern; at least one checkerboard pattern; at least one pattern comprising an arrangement of periodic or non periodic features. The illumination pattern may comprise regular and/or constant and/or periodic pattern such as a triangular pattern, a rectangular pattern, a hexagonal pattern or a pattern comprising further convex tilings. The illumination pattern may exhibit the at least one illumination feature selected from the group consisting of: at least one point; at least one line; at least two lines such as parallel or crossing lines; at least one point and one line; at least one arrangement of periodic or non-periodic feature; at least one arbitrary shaped featured. The illumination pattern may comprise at least one pattern selected from the group consisting of: at least one point pattern, in particular a pseudo-random point pattern; a random point pattern or a quasi random pattern; at least one Sobol pattern; at least one quasiperiodic pattern; at least one pattern comprising at least one pre-known feature at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines. A distance between two features, in particular spots, of the illumination pattern and/or an area of the at least one illumination feature may depend on the circle of confusion in the reflection image.

For example, the projector may be adapted to generate and/or to project a cloud of points. The projector may comprise the at least one light projector adapted to generate a cloud of points such that the illumination pattern may comprise a plurality of point pattern. The projector may comprise at least one mask adapted to generate the illumination pattern from at least one light beam generated by the light source.

For example, the projector comprises at least one laser light source, wherein the illumination pattern comprises a grid of laser spots. For example, the projector comprises at least one laser source which is designated for generating laser radiation. The projector may comprise the at least one diffractive optical element (DOE). The projector may be at least one point projector, such as the at least one laser source and the DOE, adapted to project at least one periodic point pattern. As further used herein, the term "projecting at least one illumination pattern" refers to providing the at least one illumination pattern for illuminating the at least one scene.

As used herein, the term "ray" generally refers to a line that is perpendicular to wavefronts of light which points in a direction of energy flow. As used herein, the term "beam" generally refers to a collection of rays. In the following, the terms "ray" and "beam" will be used as synonyms. As further used herein, the term "light beam" generally refers to an amount of light, specifically an amount of light traveling essentially in the same direction, including the possibility of the light beam having a spreading angle or widening angle. The light beam may have a spatial extension. Specifically, the light beam may have a non-Gaussian beam profile. The beam profile may be selected from the group consisting of a trapezoid beam profile; a triangle beam profile; a conical beam profile. The trapezoid beam profile may have a plateau region and at least one edge region. The light beam specifically may be a Gaussian light beam or a linear combination of Gaussian light beams, as will be outlined in further detail below. Other embodiments are feasible, however.

The light emitted by the projector may have a wavelength of 300 to 1100 nm, especially 500 to 1100 nm. Additionally or alternatively, light in the infrared spectral range may be used, such as in the range of 780 nm to 3.0 µm. The laser spots may have wavelengths in a near infrared (NIR) regime. Specifically, the light in the part of the near infrared region where silicon photodiodes are applicable specifically in the range of 700 nm to 1100 nm may be used. For example, the projector may be configured for emitting light beams at a wavelength range from 800 to 1000 nm, preferably at 940 nm, since terrestrial sun radiation has a local minimum in irradiance at this wavelength, e.g. as described in CIE 085-1989 "Solar spectral Irradiance". The projector may be configured for emitting light at a single wavelength. Specifically, the wavelength may be in the near infrared region. In other embodiments, the projector may be adapted to emit light with a plurality of wavelengths allowing additional measurements in other wavelengths channels.

The term "camera" as used herein is a broad term and is to be given its ordinary and customary meaning to a person of ordinary skill in the art and is not to be limited to a special or customized meaning. The term specifically may refer, without limitation, to a device having at least one imaging element configured for recording or capturing spatially resolved one-dimensional, two-dimensional or even three-dimensional optical data or information. The camera may comprise at least one pixelated camera chip. As an example, the camera may comprise at least one camera chip, such as at least one CCD chip and/or at least one CMOS chip configured for recording images. As used herein, without limitation, the term "image" specifically may relate to data recorded by using a camera, such as a plurality of electronic readings from the camera, such as the pixels of the camera chip.

The camera may comprise at least one optical sensor, in particular a plurality of optical sensors. The optical sensor has at least one light sensitive area. As used herein, an "optical sensor" generally refers to a light-sensitive device for detecting a light beam, such as for detecting an illumination and/or a light spot generated by at least one light beam. As further used herein, a "light-sensitive area" generally refers to an area of the optical sensor which may be illuminated externally, by the at least one light beam, in response to which illumination at least one sensor signal is generated. The light-sensitive area may specifically be located on a surface of the respective optical sensor. Other embodiments, however, are feasible. The camera may comprise a plurality of optical sensors each having a light sensitive area. As used herein, the term "the optical sensors each having at least one light sensitive area" refers to configurations with a plurality of single optical sensors each having one light sensitive area and to configurations with one combined optical sensor having a plurality of light sensitive areas. The term "optical sensor" furthermore refers to a light-sensitive device configured to generate one output signal. In case the camera comprises a plurality of optical sensors, each optical sensor may be embodied such that precisely one light-sensitive area is present in the respective optical sensor, such as by providing precisely one light-sensitive area which may be illuminated, in response to which illumination precisely one uniform sensor signal is created for the whole optical sensor. Thus, each optical sensor may be a single area optical sensor. The use of the single area optical sensors, however, renders the setup of the display device specifically simple and efficient. Thus, as an example, commercially available photo-sensors, such as commercially available silicon photodiodes, each having precisely one sensitive area, may be used in the set-up. Other embodiments, however, are feasible.

Preferably, the light sensitive area may be oriented essentially perpendicular to an optical axis. The optical axis may be a straight optical axis or may be bent or even split, such as by using one or more deflection elements and/or by using one or more beam splitters, wherein the essentially perpendicular orientation, in the latter cases, may refer to the local optical axis in the respective branch or beam path of the optical setup.

The optical sensor specifically may be or may comprise at least one photodetector, preferably inorganic photodetectors, more preferably inorganic semiconductor photodetectors, most preferably silicon photodetectors. Specifically, the optical sensor may be sensitive in the infrared spectral range. All pixels of the matrix or at least a group of the optical sensors of the matrix specifically may be identical. Groups of identical pixels of the matrix specifically may be provided for different spectral ranges, or all pixels may be identical in terms of spectral sensitivity. Further, the pixels may be identical in size and/or with regard to their electronic or optoelectronic properties. Specifically, the optical sensor may be or may comprise at least one inorganic photodiode which are sensitive in the infrared spectral range, preferably in the range of 700 nm to 3.0 micrometers. Specifically, the optical sensor may be sensitive in the part of the near infrared region where silicon photodiodes are applicable specifically in the range of 700 nm to 1100 nm. Infrared optical sensors which may be used for optical sensors may be commercially available infrared optical sensors, such as infrared optical sensors commercially available under the brand name Hertzstueck™ from trinamiX™ GmbH, D-67056 Ludwigshafen am Rhein, Germany. Thus, as an example, the optical sensor may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the optical sensor may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the optical sensor may comprise at least one photoconductive sensor such as a PbS or PbSe sensor, a bolometer, preferably a bolometer selected from the group consisting of a VO bolometer and an amorphous Si bolometer.

The optical sensor may be sensitive in one or more of the ultraviolet, the visible or the infrared spectral range. Specifically, the optical sensor may be sensitive in the visible spectral range from 500 nm to 780 nm, most preferably at 650 nm to 750 nm or at 690 nm to 700 nm. Specifically, the optical sensor may be sensitive in the near infrared region. Specifically, the optical sensor may be sensitive in the part of the near infrared region where silicon photodiodes are applicable specifically in the range of 700 nm to 1000 nm. The optical sensor, specifically, may be sensitive in the infrared spectral range, specifically in the range of 780 nm to 3.0 micrometers. For example, the optical sensor each, independently, may be or may comprise at least one element selected from the group consisting of a photodiode, a photocell, a photoconductor, a phototransistor or any combination thereof. For example, the camera may be or may comprise at least one element selected from the group consisting of a CCD sensor element, a CMOS sensor element, a photodiode, a photocell, a photoconductor, a phototransistor or any combination thereof. Any other type of photosensitive element may be used. The photosensitive element generally may fully or partially be made of inorganic materials and/or may fully or partially be made of organic materials. Most commonly, one or more photodiodes may be used, such as commercially available photodiodes, e.g. inorganic semiconductor photodiodes.

The camera may comprise at least one sensor element comprising a matrix of pixels. Thus, as an example, the optical sensor may be part of or constitute a pixelated optical device. For example, the camera may be and/or may comprise at least one CCD and/or CMOS device. As an example, the optical sensor may be part of or constitute at least one CCD and/or CMOS device having a matrix of pixels, each pixel forming a light-sensitive area.

As used herein, the term "sensor element" generally refers to a device or a combination of a plurality of devices configured for sensing at least one parameter. In the present case, the parameter specifically may be an optical parameter, and the sensor element specifically may be an optical sensor element. The sensor element may be formed as a unitary, single device or as a combination of several devices. The sensor element comprises a matrix of optical sensors. The sensor element may comprise at least one CMOS sensor. The matrix may be composed of independent pixels such as of independent optical sensors. Thus, a matrix of inorganic photodiodes may be composed. Alternatively, however, a commercially available matrix may be used, such as one or more of a CCD detector, such as a CCD detector chip, and/or a CMOS detector, such as a CMOS detector chip. Thus, generally, the sensor element may be and/or may comprise at least one CCD and/or CMOS device and/or the optical sensors may form a sensor array or may be part of a sensor array, such as the above-mentioned matrix. Thus, as an example, the sensor element may comprise an array of pixels, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that $0.3 \leq m/n \leq 3$, such as by choosing m/n=1:1, 4:3, 16:9 or similar. As an example, the array may be a square array, having an equal number of rows and columns, such as by choosing m=2, n=2 or m=3, n=3 or the like.

The matrix may be composed of independent pixels such as of independent optical sensors. Thus, a matrix of inorganic photodiodes may be composed. Alternatively, however, a commercially available matrix may be used, such as one or more of a CCD detector, such as a CCD detector chip, and/or a CMOS detector, such as a CMOS detector chip. Thus, generally, the optical sensor may be and/or may comprise at least one CCD and/or CMOS device and/or the optical sensors of the display device may form a sensor array or may be part of a sensor array, such as the above-mentioned matrix.

The matrix specifically may be a rectangular matrix having at least one row, preferably a plurality of rows, and a plurality of columns. As an example, the rows and columns may be oriented essentially perpendicular. As used herein, the term "essentially perpendicular" refers to the condition of a perpendicular orientation, with a tolerance of e.g. ±20° or less, preferably a tolerance of ±10° or less, more preferably a tolerance of ±5° or less. Similarly, the term "essentially parallel" refers to the condition of a parallel orientation, with a tolerance of e.g. ±20° or less, preferably a tolerance of ±10° or less, more preferably a tolerance of ±5° or less. Thus, as an example, tolerances of less than 20°, specifically less than 10° or even less than 5°, may be acceptable. In order to provide a wide range of view, the matrix specifically may have at least rows, preferably at least 500 rows, more preferably at least 1000 rows. Similarly, the matrix may have at least 10 columns, preferably at least 500 columns, more preferably at least 1000 columns. The matrix may comprise at least 50 optical sensors, preferably at least 100000 optical sensors, more preferably at least 5000000 optical sensors. The matrix may comprise a number of pixels in a multi-mega pixel range. Other embodiments, however, are feasible. Thus, in setups in which an axial rotational symmetry is to be expected, circular arrangements or concentric arrangements of the optical sensors of the matrix, which may also be referred to as pixels, may be preferred.

Thus, as an example, the sensor element may be part of or constitute a pixelated camera. For example, the sensor element may be and/or may comprise at least one CCD and/or CMOS device. As an example, the sensor element may be part of or constitute at least one CCD and/or CMOS device having a matrix of pixels, each pixel forming a light-sensitive area. The sensor element may employ a rolling shutter or global shutter method to read out the matrix of optical sensors.

As an example, the camera may be a fix-focus camera, having at least one lens which is fixedly adjusted with respect to the camera. Alternatively, however, the camera may also comprise one or more variable lenses which may be adjusted, automatically or manually.

The camera further may comprise at least one transfer device. The camera may further comprise one or more additional elements such as one or more additional optical elements. The camera may comprise at least one optical element selected from the group consisting of: transfer device, such as at least one lens and/or at least one lens system, at least one diffractive optical element. The term "transfer device", also denoted as "transfer system", may generally refer to one or more optical elements which are adapted to modify the light beam, such as by modifying one or more of a beam parameter of the light beam, a width of the light beam or a direction of the light beam. The transfer device may be adapted to guide the light beam onto the optical sensor. The transfer device specifically may comprise one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system. The transfer device may have a focal length. As used herein, the term "focal length" of the transfer device refers to a distance over which incident collimated rays which may impinge the transfer device are brought into a "focus" which may also be denoted as "focal point". Thus, the focal length constitutes a measure of an ability of the transfer device to converge an impinging light beam. Thus, the transfer device may comprise one or more imaging elements which can have the effect of a converging lens. By way of example, the transfer device can have one or more lenses, in particular one or more refractive lenses, and/or one or more convex mirrors. In this example, the focal length may be defined as a distance from the center of the thin refractive lens to the principal focal points of the thin lens. For a converging thin refractive lens, such as a convex or biconvex thin lens, the focal length may be considered as being positive and may provide the distance at which a beam of collimated light impinging the thin lens as the transfer device may be focused into a single spot. Additionally, the transfer device can comprise at least one wavelength-selective element, for example at least one optical filter. Additionally, the transfer device can be designed to impress a predefined beam profile on the electromagnetic radiation, for example, at the location of the sensor region and in particular the sensor area. The abovementioned optional embodiments of the transfer device can, in principle, be realized individually or in any desired combination.

The transfer device may have an optical axis. As used herein, the term "optical axis of the transfer device" generally refers to an axis of mirror symmetry or rotational symmetry of the lens or lens system. The transfer system, as an example, may comprise at least one beam path, with the elements of the transfer system in the beam path being located in a rotationally symmetrical fashion with respect to the optical axis. Still, one or more optical elements located within the beam path may also be off-centered or tilted with respect to the optical axis. In this case, however, the optical axis may be defined sequentially, such as by interconnecting the centers of the optical elements in the beam path, e.g. by interconnecting the centers of the lenses, wherein, in this context, the optical sensors are not counted as optical elements. The optical axis generally may denote the beam path. Therein, the camera may have a single beam path along which a light beam may travel from the object to the optical sensors, or may have a plurality of beam paths. As an example, a single beam path may be given or the beam path may be split into two or more partial beam paths. In the latter case, each partial beam path may have its own optical axis. In case of a plurality of optical sensors, the optical sensors may be located in one and the same beam path or partial beam path. Alternatively, however, the optical sensors may also be located in different partial beam paths.

The transfer device may constitute a coordinate system, wherein a longitudinal coordinate is a coordinate along the optical axis and wherein d is a spatial offset from the optical axis. The coordinate system may be a polar coordinate system in which the optical axis of the transfer device forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

The camera is configured for imaging the at least one pixelated flood image of the scene. The flood image may be generated in response to the diffuse and/or uniform illumination of the scene. The flood image may not comprise any reflection features generated by the illumination pattern. The flood image itself may comprise pixels, the pixels of the image correlating to pixels of the matrix of the sensor element. Consequently, when referring to "pixels", reference is either made to the units of image information generated by the single pixels of the sensor element or to the single pixels of the sensor element directly. The flood image may be at least one two-dimensional image. As used herein, the term "two dimensional image" may generally refer to an image having information about transversal coordinates such as the dimensions of height and width. The flood image may be an RGB (red green blue) image. The term "imaging at least one flood image" may refer to capturing and/or recording the flood image.

The camera is configured for imaging the at least one pixelated reflection image. The reflection image comprises a plurality of reflection features generated by the scene in response to the illumination pattern. As used herein, the term "reflection feature" may refer to a feature in an image plane generated by the scene in response to illumination, specifically with at least one illumination feature. Each of the reflection features comprises at least one beam profile, also denoted reflection beam profile. As used herein, the term "beam profile" of the reflection feature may generally refer to at least one intensity distribution of the reflection feature, such as of a light spot on the optical sensor, as a function of the pixel. The beam profile may be selected from the group consisting of a trapezoid beam profile; a triangle beam profile; a conical beam profile and a linear combination of Gaussian beam profiles.

Thus, the setup may comprise a camera, a laser projector and a flood light source. The camera may capture two images. One image may comprise the scene illuminated only by the laser projector. This is the resulting laser frame. The other image may comprise only the scene illuminated by the flood light source. This is the flood frame.

Step c) may comprise evaluating the flood image by using the at least one evaluation device thereby determining reflectance R(x) for each pixel position x of the flood image. The reflectance may be determined by determining a ratio of energy reflected to the total energy incident on the scene. Therefore, the evaluation device may be configured for determining an intensity value for each pixel. The reflectance may be assumed to be Lambertian reflectance.

As further used herein, the term "evaluation device" generally refers to an arbitrary device adapted to perform the named operations, preferably by using at least one data processing device and, more preferably, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the named operations. Operations, including evaluating the images. Specifically the determining the beam profile and indication of the surface, may be performed by the at least one evaluation device. Thus, as an example, one or more instructions may be implemented in software and/or hardware. Thus, as an example, the evaluation device may comprise one or more programmable devices such as one or more computers, application-specific integrated circuits (ASICs), Digital Signal Processors (DSPs), or Field Programmable Gate Arrays (FPGAs) which are configured to perform the above-mentioned evaluation. Additionally or alternatively, however, the evaluation device may also fully or partially be embodied by hardware.

The evaluation device, the camera and/or the illumination sources, i.e. the flood light source and the projector, may fully or partially be integrated into a single device. Alternatively, the evaluation device may fully or partially be embodied as separate device.

The evaluation device may be or may comprise one or more integrated circuits, such as one or more application-specific integrated circuits (ASICs), and/or one or more data processing devices, such as one or more computers, preferably one or more microcomputers and/or microcontrollers, Field Programmable Arrays, or Digital Signal Processors. Additional components may be comprised, such as one or more preprocessing devices and/or data acquisition devices, such as one or more devices for receiving and/or preprocessing of the sensor signals, such as one or more AD-converters and/or one or more filters. Further, the evaluation device may comprise one or more measurement devices, such as one or more measurement devices for measuring electrical currents and/or electrical voltages. Further, the evaluation device may comprise one or more data storage devices. Further, the evaluation device may comprise one or more interfaces, such as one or more wireless interfaces and/or one or more wire-bound interfaces.

The evaluation device can be connected to or may comprise at least one further data processing device that may be used for one or more of displaying, visualizing, analyzing, distributing, communicating or further processing of information, such as information obtained by the optical sensor and/or by the evaluation device. The data processing device, as an example, may be connected or incorporate at least one of a display, a projector, a monitor, an LCD, a TFT, a loudspeaker, a multichannel sound system, an LED pattern, or a further visualization device. It may further be connected or incorporate at least one of a communication device or communication interface, a connector or a port, capable of sending encrypted or unencrypted information using one or more of email, text messages, telephone, Bluetooth, Wi-Fi, infrared or internet interfaces, ports or connections. It may further be connected to or incorporate at least one of a processor, a graphics processor, a CPU, an Open Multimedia Applications Platform (OMAP™), an integrated circuit, a system on a chip such as products from the Apple A series or the Samsung S3C2 series, a microcontroller or microprocessor, one or more memory blocks such as ROM, RAM, EEPROM, or flash memory, timing sources such as oscillators or phase-locked loops, counter-timers, real-time timers, or power-on reset generators, voltage regulators, power management circuits, or DMA controllers. Individual units may further be connected by buses such as AMBA buses or be integrated in an Internet of Things or Industry 4.0 type network.

The evaluation device and/or the data processing device may be connected by or have further external interfaces or ports such as one or more of serial or parallel interfaces or ports, USB, Centronics Port, FireWire, HDMI, Ethernet, Bluetooth, RFID, Wi-Fi, USART, or SPI, or analogue interfaces or ports such as one or more of ADCs or DACs, or standardized interfaces or ports to further devices such as a 2D-camera device using an RGB-interface such as Camera-Link. The evaluation device and/or the data processing device may further be connected by one or more of inter-processor interfaces or ports, FPGA-FPGA-interfaces, or serial or parallel interfaces ports. The evaluation device and the data processing device may further be connected to one or more of an optical disc drive, a CD-RW drive, a DVD+RW drive, a flash drive, a memory card, a disk drive, a hard disk drive, a solid state disk or a solid state hard disk.

The evaluation device and/or the data processing device may be connected by or have one or more further external connectors such as one or more of phone connectors, RCA connectors, VGA connectors, hermaphrodite connectors, USB connectors, HDMI connectors, 8P8C connectors, BCN connectors, IEC 60320 C14 connectors, optical fiber connectors, D-subminiature connectors, RF connectors, coaxial connectors, SCART connectors, XLR connectors, and/or may incorporate at least one suitable socket for one or more of these connectors.

The evaluation device is further configured for evaluating the reflection image. The evaluating of the reflection image comprises, for each reflection feature, determining depth information by analysis of its respective beam profile and determining at least one physical light property A(x) for the respective pixel position x of the reflection image.

The evaluation of the reflection image may comprise identifying the reflection features of the reflection image. The evaluation device may be configured for performing at least one image analysis and/or image processing in order to identify the reflection features. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a blob detector; applying a corner detector; applying a Determinant of Hessian filter; applying a principle curvature-based region detector; applying a maximally stable extremal regions detector; applying a generalized Hough-transformation; applying a ridge detector; applying an affine invariant feature detector; applying an affine-adapted interest point operator; applying a Harris affine region detector; applying a Hessian affine region detector; applying a scale-invariant feature transform; applying a scale-space extrema detector; applying a local feature detector; applying speeded up robust features algorithm; applying a gradient location and orientation histogram algorithm; applying a histogram of oriented gradients descriptor; applying a Deriche edge detector; applying a differential edge detector; applying a spatio-temporal interest point detector; applying a Moravec corner detector; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing a feature within the image.

The evaluation device may be configured for performing at least one image correction. The image correction may comprise at least one background subtraction. The evaluation device may be adapted to remove influences from background light from the beam profile, for example, by an imaging without further illumination.

The evaluation device may be configured for determining the beam profile of the respective reflection feature. As used herein, the term "determining the beam profile" refers to identifying at least one reflection feature provided by the optical sensor and/or selecting at least one reflection feature provided by the optical sensor and evaluating at least one intensity distribution of the reflection feature. As an example, a region of the matrix may be used and evaluated for determining the intensity distribution, such as a three-dimensional intensity distribution or a two-dimensional intensity distribution, such as along an axis or line through the matrix. As an example, a center of illumination by the light beam may be determined, such as by determining the at least one pixel having the highest illumination, and a cross-sectional axis may be chosen through the center of illumination. The intensity distribution may an intensity distribution as a function of a coordinate along this cross-sectional axis through the center of illumination. Other evaluation algorithms are feasible.

The reflection feature may cover or may extend over at least one pixel of the reflection image. For example, the reflection feature may cover or may extend over plurality of pixels. The evaluation device may be configured for determining and/or for selecting all pixels connected to and/or belonging to the reflection feature, e.g. a light spot. The evaluation device may be configured for determining the center of intensity by $$R_{coi} = \frac{1}{l \cdot \Sigma j \cdot r_{pixel}},$$

wherein $R_{coi}$ is a position of center of intensity, $r_{pixel}$ is the pixel position and $l=\Sigma_j I_{total}$ with j being the number of pixels j connected to and/or belonging to the reflection feature and $I_{total}$ being the total intensity.

The laser frame may be evaluated by so called "beam profile analysis", also called depth-from-photon-ratio technique. With respect to depth-from-photon-ratio (DPR) technique reference is made to WO 2018/091649 A1, WO 2018/091638 A1 and WO 2018/091640 A1, the full content of which is included by reference. The named references refer to embodiments of how to determine a combined signal Q, also denoted as quotient Q, from at least one of the reflection features and determining the depth information therefrom using at least one predetermined relationship between the combined signal Q and the longitudinal coordinate.

The evaluation device is configured for determining depth information for each of the reflection features by analysis of its respective beam profile. Thus, the evaluation device may be configured for determining at least one longitudinal coordinate $z_{DPR}$ for each of the reflection features by analysis of its respective beam profile.

As used herein, the term "analysis of the beam profile" may generally refer to evaluating of the beam profile and may comprise at least one mathematical operation and/or at least one comparison and/or at least symmetrizing and/or at least one filtering and/or at least one normalizing. For example, the analysis of the beam profile may comprise at least one of a histogram analysis step, a calculation of a difference measure, application of a neural network, application of a machine learning algorithm. The evaluation device may be configured for symmetrizing and/or for normalizing and/or for filtering the beam profile, in particular to remove noise or asymmetries from recording under larger angles, recording edges or the like. The evaluation device may filter the beam profile by removing high spatial frequencies such as by spatial frequency analysis and/or median filtering or the like. Summarization may be performed by center of intensity of the light spot and averaging all intensities at the same distance to the center. The evaluation device may be configured for normalizing the beam profile to a maximum intensity, in particular to account for intensity differences due to the recorded distance. The evaluation device may be configured for removing influences from background light from the beam profile, for example, by an imaging without illumination.

The analysis of the beam profile of one of the reflection features may comprise determining at least one first area and at least one second area of the beam profile. The first area of the beam profile may be an area A1 and the second area of the beam profile may be an area A2. The evaluation device may be configured for integrating the first area and the second area. The evaluation device may be configured to derive a combined signal, in particular a quotient Q, by one or more of dividing the integrated first area and the integrated second area, dividing multiples of the integrated first area and the integrated second area, dividing linear combinations of the integrated first area and the integrated second area. The evaluation device may configured for determining at least two areas of the beam profile and/or to segment the beam profile in at least two segments comprising different areas of the beam profile, wherein overlapping of the areas may be possible as long as the areas are not congruent. For example, the evaluation device may be configured for determining a plurality of areas such as two, three, four, five, or up to ten areas. The evaluation device may be configured for segmenting the light spot into at least two areas of the beam profile and/or to segment the beam profile in at least two segments comprising different areas of the beam profile. The evaluation device may be configured for determining for at least two of the areas an integral of the beam profile over the respective area. The evaluation device may be configured for comparing at least two of the determined integrals. Specifically, the evaluation device may be configured for determining at least one first area and at least one second area of the beam profile. As used herein, the term "area of the beam profile" generally refers to an arbitrary region of the beam profile at the position of the optical sensor used for determining the quotient Q. The first area of the beam profile and the second area of the beam profile may be one or both of adjacent or overlapping regions. The first area of the beam profile and the second area of the beam profile may be not congruent in area. For example, the evaluation device may be configured for dividing a sensor region of the CMOS sensor into at least two sub-regions, wherein the evaluation device may be configured for dividing the sensor region of the CMOS sensor into at least one left part and at least one right part and/or at least one upper part and at least one lower part and/or at least one inner and at least one outer part. Additionally or alternatively, the camera may comprise at least two optical sensors, wherein the light-sensitive areas of a first optical sensor and of a second optical sensor may be arranged such that the first optical sensor is adapted to determine the first area of the beam profile of the reflection feature and that the second optical sensor is adapted to determine the second area of the beam profile of the reflection feature. The evaluation device may be adapted to integrate the first area and the second area. The evaluation device may be configured for using at least one predetermined relationship between the quotient Q and the longitudinal coordinate for determining the longitudinal coordinate. The predetermined relationship may be one or more of an empiric relationship, a semi-empiric relationship and an analytically derived relationship. The evaluation device may comprise at least one data storage device for storing the predetermined relationship, such as a lookup list or a lookup table.

The first area of the beam profile may comprise essentially edge information of the beam profile and the second area of the beam profile comprises essentially center information of the beam profile, and/or the first area of the beam profile may comprise essentially information about a left part of the beam profile and the second area of the beam profile comprises essentially information about a right part of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. As used herein, the term "essentially center information" generally refers to a low proportion of edge information, i.e. proportion of the intensity distribution corresponding to edges, compared to a proportion of the center information, i.e. proportion of the intensity distribution corresponding to the center. Preferably, the center information has a proportion of edge information of less than 10%, more preferably of less than 5%, most preferably the center information comprises no edge content. As used herein, the term "essentially edge information" generally refers to a low proportion of center information compared to a proportion of the edge information. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region.

Other selections of the first area A1 and second area A2 may be feasible. For example, the first area may comprise essentially outer regions of the beam profile and the second area may comprise essentially inner regions of the beam profile. For example, in case of a two-dimensional beam profile, the beam profile may be divided in a left part and a right part, wherein the first area may comprise essentially areas of the left part of the beam profile and the second area may comprise essentially areas of the right part of the beam profile.

The edge information may comprise information relating to a number of photons in the first area of the beam profile and the center information may comprise information relating to a number of photons in the second area of the beam profile. The evaluation device may be configured for determining an area integral of the beam profile. The evaluation device may be configured for determining the edge information by integrating and/or summing of the first area. The evaluation device may be configured for determining the center information by integrating and/or summing of the second area. For example, the beam profile may be a trapezoid beam profile and the evaluation device may be configured for determining an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

In one embodiment, A1 may correspond to a full or complete area of a feature point on the optical sensor. A2 may be a central area of the feature point on the optical sensor. The central area may be a constant value. The central area may be smaller compared to the full area of the feature point. For example, in case of a circular feature point, the central area may have a radius from 0.1 to 0.9 of a full radius of the feature point, preferably from 0.4 to 0.6 of the full radius.

In one embodiment, the illumination pattern may comprise at least one line pattern. A1 may correspond to an area with a full line width of the line pattern on the optical sensors, in particular on the light sensitive area of the optical sensors. The line pattern on the optical sensor may be widened and/or displaced compared to the line pattern of the illumination pattern such that the line width on the optical sensors is increased. In particular, in case of a matrix of optical sensors, the line width of the line pattern on the optical sensors may change from one column to another column. A2 may be a central area of the line pattern on the optical sensor. The line width of the central area may be a constant value, and may in particular correspond to the line width in the illumination pattern. The central area may have a smaller line width compared to the full line width. For example, the central area may have a line width from 0.1 to 0.9 of the full line width, preferably from 0.4 to 0.6 of the full line width. The line pattern may be segmented on the optical sensors. Each column of the matrix of optical sensors may comprise center information of intensity in the central area of the line pattern and edge information of intensity from regions extending further outwards from the central area to edge regions of the line pattern.

In one embodiment, the illumination pattern may comprise at least point pattern. A1 may correspond to an area with a full radius of a point of the point pattern on the optical sensors. A2 may be a central area of the point in the point pattern on the optical sensors. The central area may be a constant value. The central area may have a radius compared to the full radius. For example, the central area may have a radius from 0.1 to 0.9 of the full radius, preferably from 0.4 to 0.6 of the full radius.

The illumination pattern may comprise both at least one point pattern and at least one line pattern. Other embodiments in addition or alternatively to line pattern and point pattern are feasible.

The evaluation device may be configured to derive a quotient Q by one or more of dividing the integrated first area and the integrated second area, dividing multiples of the integrated first area and the integrated second area, dividing linear combinations of the integrated first area and the integrated second area.

The evaluation device may be configured to derive the quotient Q by one or more of dividing the first area and the second area, dividing multiples of the first area and the second area, dividing linear combinations of the first area and the second area. The evaluation device may be configured for deriving the quotient Q by $$Q = \frac{\int\int_{A1} E(x, y) dx dy}{\int\int_{A2} E(x, y) dx dy}$$

wherein x and y are transversal coordinates, A1 and A2 are the first and second area of the beam profile, respectively, and E(x,y) denotes the beam profile.

Additionally or alternatively, the evaluation device may be adapted to determine one or both of center information or edge information from at least one slice or cut of the light spot. This may be realized, for example, by replacing the area integrals in the quotient Q by a line integral along the slice or cut. For improved accuracy, several slices or cuts through the light spot may be used and averaged. In case of an elliptical spot profile, averaging over several slices or cuts may result in improved distance information.

For example, in case of the optical sensor having a matrix of pixels, the evaluation device may be configured for evaluating the beam profile, by determining the pixel having the highest sensor signal and forming at least one center signal;

evaluating sensor signals of the matrix and forming at least one sum signal;

determining the quotient Q by combining the center signal and the sum signal; and determining at least one longitudinal coordinate z of the object by evaluating the quotient Q.

As used herein, a "sensor signal" generally refers to a signal generated by the optical sensor and/or at least one pixel of the optical sensor in response to illumination. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the display device, the optical sensor or any other element may be adapted to process or preprocess the sensor signal, thereby generating secondary sensor signals, which may also be used as sensor signals, such as preprocessing by filtering or the like. The term "center signal" generally refers to the at least one sensor signal comprising essentially center information of the beam profile. As used herein, the term "highest sensor signal" refers to one or both of a local maximum or a maximum in a region of interest. For example, the center signal may be the signal of the pixel having the highest sensor signal out of the plurality of sensor signals generated by the pixels of the entire matrix or of a region of interest within the matrix, wherein the region of interest may be predetermined or determinable within an image generated by the pixels of the matrix. The center signal may arise from a single pixel or from a group of optical sensors, wherein, in the latter case, as an example, the sensor signals of the group of pixels may be added up, integrated or averaged, in order to determine the center signal. The group of pixels from which the center signal arises may be a group of neighboring pixels, such as pixels having less than a predetermined distance from the actual pixel having the highest sensor signal, or may be a group of pixels generating sensor signals being within a predetermined range from the highest sensor signal. The group of pixels from which the center signal arises may be chosen as large as possible in order to allow maximum dynamic range. The evaluation device may be adapted to determine the center signal by integration of the plurality of sensor signals, for example the plurality of pixels around the pixel having the highest sensor signal. For example, the beam profile may be a trapezoid beam profile and the evaluation device may be adapted to determine an integral of the trapezoid, in particular of a plateau of the trapezoid.

As outlined above, the center signal generally may be a single sensor signal, such as a sensor signal from the pixel in the center of the light spot, or may be a combination of a plurality of sensor signals, such as a combination of sensor signals arising from pixels in the center of the light spot, or a secondary sensor signal derived by processing a sensor signal derived by one or more of the aforementioned possibilities. The determination of the center signal may be performed electronically, since a comparison of sensor signals is fairly simply implemented by conventional electronics, or may be performed fully or partially by software. Specifically, the center signal may be selected from the group consisting of: the highest sensor signal; an average of a group of sensor signals being within a predetermined range of tolerance from the highest sensor signal; an average of sensor signals from a group of pixels containing the pixel having the highest sensor signal and a predetermined group of neighboring pixels; a sum of sensor signals from a group of pixels containing the pixel having the highest sensor signal and a predetermined group of neighboring pixels; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring pixels; an integral of a group of sensor signals being within a predetermined range of tolerance from the highest sensor signal; an integral of a group of sensor signals being above a predetermined threshold.

Similarly, the term "sum signal" generally refers to a signal comprising essentially edge information of the beam profile. For example, the sum signal may be derived by adding up the sensor signals, integrating over the sensor signals or averaging over the sensor signals of the entire matrix or of a region of interest within the matrix, wherein the region of interest may be predetermined or determinable within an image generated by the optical sensors of the matrix. When adding up, integrating over or averaging over the sensor signals, the actual optical sensors from which the sensor signal is generated may be left out of the adding, integration or averaging or, alternatively, may be included into the adding, integration or averaging. The evaluation device may be adapted to determine the sum signal by integrating signals of the entire matrix, or of the region of interest within the matrix. For example, the beam profile may be a trapezoid beam profile and the evaluation device may be adapted to determine an integral of the entire trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Similarly, the center signal and edge signal may also be determined by using segments of the beam profile such as circular segments of the beam profile. For example, the beam profile may be divided into two segments by a secant or a chord that does not pass the center of the beam profile. Thus, one segment will essentially contain edge information, while the other segment will contain essentially center information. For example, to further reduce the amount of edge information in the center signal, the edge signal may further be subtracted from the center signal.

The quotient Q may be a signal which is generated by combining the center signal and the sum signal. Specifically, the determining may include one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa. Additionally or alternatively, the quotient Q may comprise an arbitrary signal or signal combination which contains at least one item of information on a comparison between the center signal and the sum signal.

The evaluation device may be configured for using the at least one predetermined relationship between the quotient Q and the longitudinal coordinate for determining the longitudinal coordinate. The predetermined relationship may be one or more of an empiric relationship, a semi-empiric relationship and an analytically derived relationship. The evaluation device may comprise at least one data storage device for storing the predetermined relationship, such as a lookup list or a lookup table.

The evaluation device may be configured for executing at least one algorithm which computes distances for all reflection features with zero order and higher order. The method may comprise determining the at least one depth level from the depth information of said reflection features by using the evaluation device. The evaluation device may be configured for determining a first depth map of from the depth information of the reflection features. The first depth map may be a thinly filled depth map comprising a few entries. Alternatively, the depth may be crowded comprising a large amount of entries.

The evaluation device is configured for determining at least one physical light property A(x) for the respective pixel position x of the reflection image. The physical light property A(x) may be one or more of reflectance or albedo. Thus, step d) may yield depth information and light physical quantities of each reflection feature, e.g. each laser spot.

In step e), the evaluation device, assigns, for each reflection feature, the determined depth information and the determined physical light property A(x) to a corresponding pixel of the flood image and extrapolates the determined depth information and the determined physical light property A(x) to similar pixels of the flood image around said corresponding pixel.

The method may comprise at least one calibration step, wherein the calibration step comprises determining a position of the projector. Thus, the position of the projector may be known. Therefore, physical light properties such as reflectance or albedo can be estimated.

The information determined in step d) would be only available on the spot's positions itself. The present invention proposes to extrapolate the information around the spot positions. The flood image may be used for assign the information in a meaningful way. It can be assumed that similar pixels in the flood image have similar spot information. The term "similar pixels" as used herein, is a broad term and is to be given its ordinary and customary meaning to a person of ordinary skill in the art and is not to be limited to a special or customized meaning. The term specifically may refer, without limitation, to pixels having similar intensity compared to the pixel of the reflection feature, in particular, the center of the reflection feature. Similar may refer to identical intensity and/or identical within a tolerance range of 20%, preferably 10%, more preferably 5%, of the intensity of the pixel of the reflection feature. The term "around said corresponding pixel" may refer to pixels within a pixel area around said corresponding pixel. The pixels around said corresponding pixel may be neighboring pixels. The pixel area may be predefined and/or may be selected by the evaluation device. The pixel area may be circular or rectangular around the corresponding pixel which may be positioned in a center. Other shapes of the pixel area are possible. The pixel area may be selected depending on determined depth information and/or resolution and the like. The extrapolation may be performed reflection feature wise, i.e. piecewise for each laser spot of the point cloud. By extrapolating the information it may be possible to change the representation of the spot information from a spare spot list to a dense pixel map.

Step f) comprises the evaluation device, determining the depth map by using a shape-from-shading technique considering the determined reflectance R(x), the determined depth information and the determined physical light property A(x). Specifically, step f) comprises reconstructing the surface of the object. The determined reflectance R(x), the determined depth information and the determined physical light property A(x) may be used for surface reconstruction of the object using shape-from-shading. In case the light direction of the flood light source is known, the depth map can be refined using a shape-from-shading approach. The term "shape-from-shading" as used herein, is a broad term and is to be given its ordinary and customary meaning to a person of ordinary skill in the art and is not to be limited to a special or customized meaning. The term specifically may refer, without limitation, to a method in computer vision for determining 3D depth information from one or more 2D images. With respect for shape-from-shading reference is made to B. Horn, "Obtaining shape from shading information", in P. Winston, editor, The Psychology of Computer Vision, McGraw-Hill, New York, 1975.

The reflectance is known from the flood image. In addition, the physical light property A(x), in particular the albedo, was determined as described above using the extrapolation. This may allow to determine the implicit given normal field n, i.e.

$$R(x)=A(x)\langle n(x),l(x)\rangle,$$

where x is the pixel position in the image and I(x) is the light direction of the flood light source. The normal field is used to refine the depth map of the beam profile analysis.

Several shape-from-shading techniques are known by the skilled person such as minimization approaches. However, other approach may be used, too.

For example, a variational method may be used. The determining of the depth map in step f) comprises solving at least one optimization problem thereby determining a normal map n(x), wherein the optimization problem is given by $$\int \|R(x)-A(x)\langle n(x),l(x)\rangle\|^2+\lambda\|\nabla n\|^2 dx \to \min,$$

wherein λ is a constant and I(x) is the light direction of the flood light source. The normal map n(x) is a distribution of surface normal as a function of pixel position x, wherein the surface normal is the orientation of a vector perpendicular to a tangent plane on a surface of the object. This optimization problem yields a normal map n(x). Additionally, a depth map is given. The normal information can be determined by the derivatives of the depth map, i.e.

$$n = \begin{pmatrix} -\nabla z \\ 1 \end{pmatrix} \cdot \frac{1}{\sqrt{1+\|\nabla z\|^2}}$$

The Poisson surface reconstruction may be performed as described in M. Kazhdan, M. Bolitho and H. Hoppe, "Poisson Surface Reconstruction", Eurographics Symposium on Geometry Processing (2006). The derivation to z can be determined from the normal map n, i.e $$\nabla z = -\frac{n_x}{n_z}.$$

wherein $n_x$ are the first two components of n and $n_z$ is the third component. Applying the divergence of the gradient field yields the Poisson equation $$\Delta z = \nabla \cdot \nabla z = -\nabla\left(\frac{n_x}{n_z}\right).$$

Solving the Poisson equation allows to find a depth map that is close to the desired normal map.

In a further aspect of the present invention a computer program for determining a depth map configured for causing a computer or a computer network to fully or partially perform the method according to the present invention, when executed on the computer or the computer network, wherein the computer program is configured for performing and/or executing at least steps c) to f) of the method according to the present invention. Specifically, the computer program may be stored on a computer-readable data carrier and/or on a computer-readable storage medium.

As used herein, the terms "computer-readable data carrier" and "computer-readable storage medium" specifically may refer to non-transitory data storage means, such as a hard-ware storage medium having stored thereon computer-executable instructions. The computer-readable data carrier or storage medium specifically may be or may comprise a storage medium such as a random-access memory (RAM) and/or a read-only memory (ROM).

Thus, specifically, one, more than one or even all of method steps as indicated above may be performed by using a computer or a computer network, preferably by using a computer program.

In a further aspect a computer-readable storage medium comprising instructions which, when executed by a computer or computer network, cause to carry out at least steps c) to f), in particular all steps, of the method according to the present invention.

Further disclosed and proposed herein is a data carrier having a data structure stored thereon, which, after loading into a computer or computer network, such as into a working memory or main memory of the computer or computer network, may execute the method according to one or more of the embodiments disclosed herein.

Further disclosed and proposed herein is a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier and/or on a computer-readable storage medium. Specifically, the computer program product may be distributed over a data network.

Finally, disclosed and proposed herein is a modulated data signal which contains instructions readable by a computer system or computer network, for performing the method according to one or more of the embodiments disclosed herein.

Referring to the computer-implemented aspects of the invention, one or more of the method steps or even all of the method steps of the methods according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work.

Specifically, further disclosed herein are:
- a computer or computer network comprising at least one processor, wherein the processor is adapted to perform the method according to one of the embodiments described in this description,
- a computer loadable data structure that is adapted to perform the method according to one of the embodiments described in this description while the data structure is being executed on a computer,
- a computer program, wherein the computer program is adapted to perform the method according to one of the embodiments described in this description while the program is being executed on a computer,
- a computer program comprising program means for performing the method according to one of the embodiments described in this description while the computer program is being executed on a computer or on a computer network,
- a computer program comprising program means according to the preceding embodiment, wherein the program means are stored on a storage medium readable to a computer,
- a storage medium, wherein a data structure is stored on the storage medium and wherein the data structure is adapted to perform the methods according to one of the embodiments described in this description after having been loaded into a main and/or working storage of a computer or of a computer network, and
- a computer program product having program code means, wherein the program code means can be stored or are stored on a storage medium, for performing the method according to one of the embodiments described in this description, if the program code means are executed on a computer or on a computer network.

In a further aspect a detector is proposed. With respect to definitions and embodiments of the detector reference is made to definitions and embodiments described with respect to the method.

The detector comprises
- at least one flood light source configured for illuminating a scene comprising at least one object, wherein the illumination from the flood light source has a predefined and/or predetermined light direction,
- at least one projector configured for projecting at least one illumination pattern on the scene;
- at least one camera configured for imaging at least one pixelated flood image of the scene and for imaging at least one pixelated reflection image, wherein the reflection image comprises a plurality of reflection features generated by the scene in response to the illumination pattern, wherein each of the reflection features comprises a beam profile;
- at least one evaluation device configured for evaluating the flood image thereby determining reflectance $R(x)$ for each pixel position x of the flood image, wherein the evaluation device is configured for evaluating the reflection image, wherein the evaluation comprises, for each reflection feature, determining depth information by analysis of its respective beam profile and determining at least one physical light property $A(x)$ for the respective pixel position x of the reflection image, wherein the evaluation device is configured for assigning, for each reflection feature, the determined depth information and the determined physical light property $A(x)$ to a corresponding pixel of the flood image and extrapolating the determined depth information and the determined physical light property $A(x)$ to similar pixels of the flood image around said corresponding pixel, wherein the evaluation device is configured for determining the depth map by using a shape-from-shading technique considering the determined reflectance R(x), the determined depth information and the determined physical light property A(x).

The detector may be configured for performing the method according to the present invention.

In a further aspect of the present invention, use of the display device according to the present invention, such as according to one or more of the embodiments given above or given in further detail below, is proposed, for a purpose of use, selected from the group consisting of: a position measurement in traffic technology; an entertainment application; a security application; a surveillance application; a safety application; a human-machine interface application; a tracking application; a photography application; an imaging application or camera application; a mapping application for generating maps of at least one space; a homing or tracking beacon detector for vehicles; an outdoor application; a mobile application; a communication application; a machine vision application; a robotics application; a quality control application; a manufacturing application, automotive application.

For example, the automotive application may comprise driver monitoring and/or personalized vehicles.

With respect to further uses of the detector and the method of the present invention reference is made to WO 2018/091649 A1, WO 2018/091638 A1 and WO 2018/091640 A1, the content of which is included by reference.

Overall, in the context of the present invention, the following embodiments are regarded as preferred:

Embodiment 1. A method for determining a depth map of at least one object, wherein the method comprises the following steps:
a) illuminating a scene comprising the object by using at least one flood light source, wherein the illumination from the flood light source has a predefined and/or predetermined light direction, imaging at least one pixelated flood image of the scene by using at least one camera;
b) projecting at least one illumination pattern on the scene by using at least one projector and imaging at least one pixelated reflection image using the camera, wherein the reflection image comprises a plurality of reflection features generated by the scene in response to the illumination pattern, wherein each of the reflection features comprises a beam profile;
c) evaluating the flood image by using at least one evaluation device thereby determining reflectance R(x) for each pixel position x of the flood image;
d) evaluating the reflection image by using the evaluation device, wherein the evaluation comprises, for each reflection feature, determining depth information by analysis of its respective beam profile and determining at least one physical light property A(x) for the respective pixel position x of the reflection image;
e) the evaluation device, assigning, for each reflection feature, the determined depth information and the determined physical light property A(x) to a corresponding pixel of the flood image and extrapolating the determined depth information and the determined physical light property A(x) to similar pixels of the flood image around said corresponding pixel;
f) the evaluation device, determining the depth map by using a shape-from-shading technique considering the determined reflectance R(x), the determined depth information and the determined physical light property A(x).

Embodiment 2. The method according to the preceding embodiment, wherein the determining of the depth map in step f) comprises solving at least one optimization problem thereby determining a normal map n(x), wherein the optimization problem is given by $$\int \|R(x)-A(x)\langle n(x),l(x)\rangle\|^2+\lambda\|\nabla n\|^2 dx \to \min,$$

wherein $\lambda$ is a constant and I(x) is the light direction of the flood light source.

Embodiment 3. The method according to the preceding embodiment, wherein the normal map n(x) is a distribution of surface normal as a function of pixel position x, wherein the surface normal is the orientation of a vector perpendicular to a tangent plane on a surface of the object.

Embodiment 4. The method according to any one of the two preceding embodiments, wherein the determining of the depth map in step f) comprises determining the depth map z from the normal map n(x) by solving the Poisson equation $$\Delta z = \nabla \cdot \nabla z = -\nabla \left(\frac{n_x}{n_z}\right),$$

wherein $n_x$ are the first two components of n and $n_z$ is the third component.

Embodiment 5. The method according to any one of the preceding embodiments, wherein the physical light property A(x) is one or more of reflectance or albedo.

Embodiment 6. The method according to any one of the preceding embodiments, wherein the flood light source comprises at least one light-emitting-diode (LED).

Embodiment 7. The method according to any one of the preceding embodiments, wherein the projector comprises at least one laser light source, wherein the illumination pattern comprises a grid of laser spots.

Embodiment 8. The method according to the preceding embodiment, wherein the laser spots have wavelengths in a near infrared (NIR) regime.

Embodiment 9. The method according to any one of the preceding embodiments, wherein the camera comprises at least one pixelated camera chip, wherein the camera comprises at least one CCD chip and/or at least one CMOS chip.

Embodiment 10. The method according to any one of the preceding embodiments, wherein the camera is or comprises at least one near infrared camera.

Embodiment 11. The method according to any one of the preceding embodiments, wherein the method comprises at least one calibration step, wherein the calibration step comprises determining a position of the projector.

Embodiment 12. A detector comprising
at least one flood light source configured for illuminating a scene comprising at least one object, wherein the illumination from the flood light source has a predefined and/or predetermined light direction,
at least one projector configured for projecting at least one illumination pattern on the scene;
at least one camera configured for imaging at least one pixelated flood image of the scene and for imaging at least one pixelated reflection image, wherein the reflection image comprises a plurality of reflection features generated by the scene in response to the illumination pattern, wherein each of the reflection features comprises a beam profile;

at least one evaluation device configured for evaluating the flood image thereby determining reflectance R(x) for each pixel position x of the flood image, wherein the evaluation device is configured for evaluating the reflection image, wherein the evaluation comprises, for each reflection feature, determining depth information by analysis of its respective beam profile and determining at least one physical light property A(x) for the respective pixel position x of the reflection image, wherein the evaluation device is configured for assigning, for each reflection feature, the determined depth information and the determined physical light property A(x) to a corresponding pixel of the flood image and extrapolating the determined depth information and the determined physical light property A(x) to similar pixels of the flood image around said corresponding pixel, wherein the evaluation device is configured for determining the depth map by using a shape-from-shading technique considering the determined reflectance R(x), the determined depth information and the determined physical light property A(x).

Embodiment 13. The detector according to the preceding embodiment, wherein the detector is configured for performing the method according to any one of the preceding embodiments referring to a method.

Embodiment 14. Computer program for determining a depth map configured for causing a computer or a computer network to fully or partially perform the method according to any one of the preceding embodiments, when executed on the computer or the computer network, wherein the computer program is configured for performing and/or executing at least steps c) to f) of the method according to any one of the preceding embodiments referring to a method.

Embodiment 15. A computer-readable storage medium comprising instructions which, when executed by a computer or computer network, cause to carry out at least steps c) to f) of the method according to any one of the preceding embodiments referring to a method.

Embodiment 16. A use of the detector according to any one of the preceding embodiments relating to a detector, for a purpose of use, selected from the group consisting of: a position measurement in traffic technology; an entertainment application; a security application; a surveillance application; a safety application; a human-machine interface application; a tracking application; a photography application; an imaging application or camera application; a mapping application for generating maps of at least one space; a homing or tracking beacon detector for vehicles; an outdoor application; a mobile application; a communication application; a machine vision application; a robotics application; a quality control application; a manufacturing application, automotive application.

BRIEF DESCRIPTION OF THE FIGURES

Further optional details and features of the invention are evident from the description of preferred exemplary embodiments which follows in conjunction with the dependent claims. In this context, the particular features may be implemented in an isolated fashion or in combination with other features. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures:
Specifically, in the figures.

DETAILED DESCRIPTION OF THE EMBODIMENTS

Figure 1:
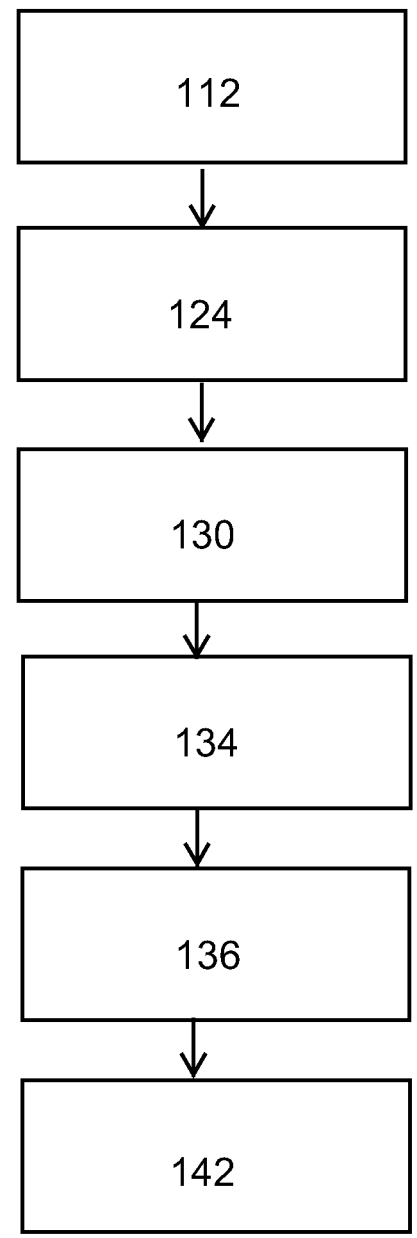
FIG. 1 shows an embodiment of a method for determining a depth map of at least one object according to the present invention.

FIG. 1 shows a flowchart of an embodiment of a method for determining a depth map of at least one object 110 according to the present invention.

The method steps may be performed in the given order or may be performed in a different order. Further, one or more additional method steps may be present which are not listed. Further, one, more than one or even all of the method steps may be performed repeatedly. For details, options and definitions, reference may be made to the display device as discussed above. Thus, specifically, as outlined above, the method may comprise using the display device according to the present invention, such as according to one or more of the embodiments given above or given in further detail below.

The method comprises the following steps:
a) (reference number 112) illuminating a scene 114 comprising the object 110 by using at least one flood light source 116, wherein the illumination from the flood light source 116 has a predefined and/or predetermined light direction 118, imaging at least one pixelated flood image 120 of the scene 114 by using at least one camera 122;
b) (reference number 124) projecting at least one illumination pattern on the scene 114 by using at least one projector 126 and imaging at least one pixelated reflection image 128 using the camera 122, wherein the reflection image 128 comprises a plurality of reflection features generated by the scene in response to the illumination pattern, wherein each of the reflection features comprises a beam profile;
c) (reference number 130) evaluating the flood image 120 by using at least one evaluation device 132 thereby determining reflectance R(x) for each pixel position x of the flood image 120;
d) (reference number 134) evaluating the reflection image 128 by using the evaluation device 132, wherein the evaluation comprises, for each reflection feature, determining depth information by analysis of its respective beam profile and determining at least one physical light property A(x) for the respective pixel position x of the reflection image;
e) (reference number 136) the evaluation device 132, assigning (denoted with reference number 138), for each reflection feature, the determined depth information and the determined physical light property A(x) to a corresponding pixel of the flood image 120 and extrapolating (denoted with arrows 140) the determined depth information and the determined physical light property A(x) to similar pixels of the flood image 120 around said corresponding pixel;
f) (reference number 142) the evaluation device 132, determining the depth map by using a shape-from-shading technique considering the determined reflectance R(x), the determined depth information and the determined physical light property A(x).

The object 110 may be an arbitrary object, in particular a surface or region, which is configured to reflect at least partially at least one light beam impinging on the object 110. The light beam may originate from the projector 126 and/or flood light source 116 illuminating the object 110. The light beam is emitted e.g. reflected or scattered by the object 110. The object 110 may be an arbitrary object to be measured such as a living or non-living object. The scene 114 may at least one arbitrary object or spatial region. The scene 114 may comprise the at least one object 110 and a surrounding environment.

Figure 3:
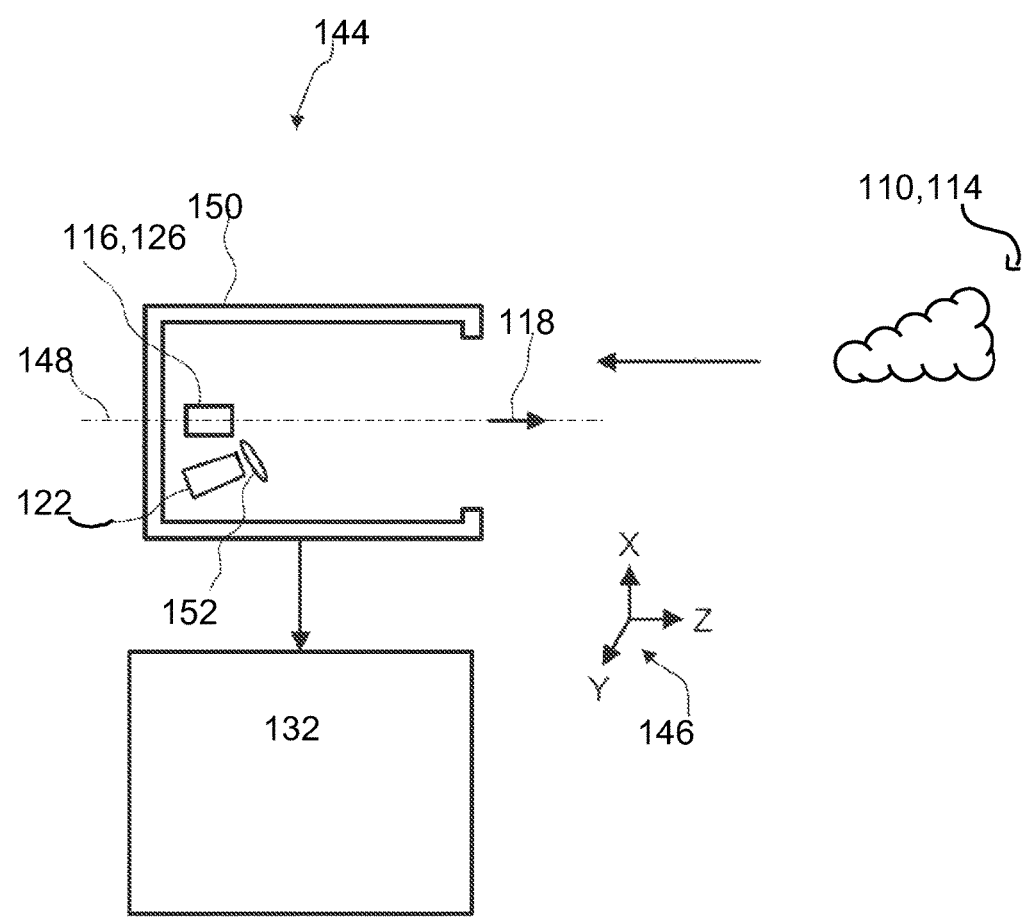
FIG. 3 shows an embodiment of extrapolation of step e).

FIG. 3 shows in a highly schematic fashion an embodiment of a detector 144 according to the present invention. The detector 144 comprises the at least one flood light source 116 configured for illuminating the scene 114 comprising the at least one object 110. The illumination from the flood light source 116 has the predefined and/or predetermined light direction 118.

The flood light source 116 may be configured for scene illumination. The scene illumination may comprise diffuse and/or uniform illumination of the scene 114. The flood light source 116 may be adapted to directly or indirectly illuminating the scene 114, wherein the illumination is reflected or scattered by surfaces of the scene 114 and, thereby, is at least partially directed towards the camera 122. The flood light source 116 may be adapted to illuminate the scene 114, for example, by directing a light beam towards the scene, which reflects the light beam. The flood light source 116 may be configured for generating an illuminating light beam for illuminating the scene 114.

The flood light source 116 may comprise at least one light-emitting-diode (LED). The flood light source 116 may illuminate the scene 114 with the LED and, in particular, without the illumination pattern, and the camera 122 may be configured for capturing a two-dimensional image of the scene 114. The flood light source 116 may comprise a single light source or a plurality of light sources. As an example, the light emitted by the flood light source 116 may have a wavelength of 300 to 1100 nm, especially 500 to 1100 nm. Additionally or alternatively, light in the infrared spectral range may be used, such as in the range of 780 nm to 3.0 µm. Specifically, the light in the part of the near infrared region where silicon photodiodes are applicable specifically in the range of 700 nm to 1100 nm may be used. The flood light source 116 may be configured for emitting light at a single wavelength. Specifically, the wavelength may be in the near infrared region. In other embodiments, the flood light source 116 may be adapted to emit light with a plurality of wavelengths allowing additional measurements in other wavelengths channels.

The detector 144 comprises the at least one projector 126 configured for projecting at least one illumination pattern on the scene 114.

The projector 126 and flood light source 116 may constitute a coordinate system 146, wherein a longitudinal coordinate is a coordinate along an optical axis 148. A direction parallel or antiparallel to the z-axis may be considered a longitudinal direction, and a coordinate along the z-axis may be considered a longitudinal coordinate z. Any direction perpendicular to the z-axis may be considered a transversal direction, and the polar coordinate and/or the polar angle may be considered a transversal coordinate.

The projector 126 may be at least one illumination device configured for providing the at least one illumination pattern. The projector 126 may be or may comprise at least one light source or at least one multiple beam light source. For example, the projector 126 may comprise at least one laser source and one or more diffractive optical elements (DOEs). Specifically, the projector 126 may comprise at least one laser and/or laser source. Various types of lasers may be employed, such as semiconductor lasers, double heterostructure lasers, external cavity lasers, separate confinement heterostructure lasers, quantum cascade lasers, distributed bragg reflector lasers, polariton lasers, hybrid silicon lasers, extended cavity diode lasers, quantum dot lasers, volume Bragg grating lasers, Indium Arsenide lasers, transistor lasers, diode pumped lasers, distributed feedback lasers, quantum well lasers, interband cascade lasers, Gallium Arsenide lasers, semiconductor ring laser, extended cavity diode lasers, or vertical cavity surface-emitting lasers. Additionally or alternatively, non-laser light sources may be used, such as LEDs, micro-light emitting diode (LED), and/or light bulbs. The projector 126 may comprise one or more diffractive optical elements (DOEs) configured for generating the illumination pattern. For example, the projector 126 may be adapted to generate and/or to project a cloud of points, for example the projector source may comprise one or more of at least one digital light processing projector, at least one LCoS projector, at least one spatial light modulator; at least one diffractive optical element; at least one array of light emitting diodes; at least one array of laser light sources. On account of their generally defined beam profiles and other properties of handleability, the use of at least one laser source is particularly preferred. The projector 126 and the flood light source 116 may be integrated into a housing 150 of the detector 144.

The illumination pattern may be at least one arbitrary pattern comprising at least one illumination feature adapted to illuminate at least one part of the scene 114. The illumination feature may be at least one at least partially extended feature of the pattern. The illumination pattern may comprise a single illumination feature. The illumination pattern may comprise a plurality of illumination features. The illumination pattern may be selected from the group consisting of: at least one point pattern; at least one line pattern; at least one stripe pattern; at least one checkerboard pattern; at least one pattern comprising an arrangement of periodic or non periodic features. The illumination pattern may comprise regular and/or constant and/or periodic pattern such as a triangular pattern, a rectangular pattern, a hexagonal pattern or a pattern comprising further convex tilings. The illumination pattern may exhibit the at least one illumination feature selected from the group consisting of: at least one point; at least one line; at least two lines such as parallel or crossing lines; at least one point and one line; at least one arrangement of periodic or non-periodic feature; at least one arbitrary shaped featured. The illumination pattern may comprise at least one pattern selected from the group consisting of: at least one point pattern, in particular a pseudo-random point pattern; a random point pattern or a quasi random pattern; at least one Sobol pattern; at least one quasiperiodic pattern; at least one pattern comprising at least one pre-known feature at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines. A distance between two features, in particular spots, of the illumination pattern and/or an area of the at least one illumination feature may depend on the circle of confusion in the reflection image 128.

The light emitted by the projector 126 may have a wavelength of 300 to 1100 nm, especially 500 to 1100 nm. Additionally or alternatively, light in the infrared spectral range may be used, such as in the range of 780 nm to 3.0 µm. The laser spots may have wavelengths in a near infrared (NIR) regime. Specifically, the light in the part of the near infrared region where silicon photodiodes are applicable specifically in the range of 700 nm to 1100 nm may be used. For example, the projector 126 may be configured for emitting light beams at a wavelength range from 800 to 1000 nm, preferably at 940 nm, since terrestrial sun radiation has a local minimum in irradiance at this wavelength, e.g. as described in CIE 085-1989 "Solar spectral Irradiance". The projector 126 may be configured for emitting light at a single wavelength. Specifically, the wavelength may be in the near infrared region. In other embodiments, the projector 126 may be adapted to emit light with a plurality of wavelengths allowing additional measurements in other wavelengths channels.

The detector 144 comprises the at least one camera 122 configured for imaging the pixelated flood image 120 and for imaging the pixelated reflection image 128. The camera 122 may comprise at least one pixelated camera chip. As an example, the camera 122 may comprise at least one camera chip, such as at least one CCD chip and/or at least one CMOS chip configured for recording images.

The detector 144, e.g. the camera 122, may comprise at least one transfer device 152, such as a lens or lens system. The transfer device 152 specifically may comprise one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system. The transfer device 152 may have a focal length.

Figure 2:
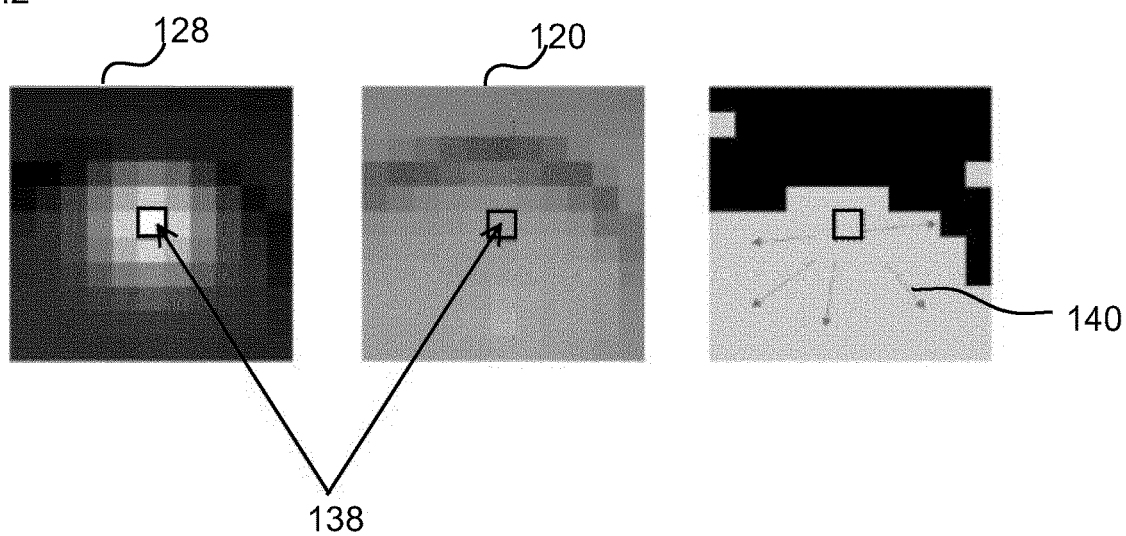
FIG. 2 shows an embodiment of a detector according to the present invention.

The camera 122 is configured for imaging the at least one pixelated flood image 120. The flood image 120 may be generated in response to the diffuse and/or uniform illumination of the scene 114. An example, of the flood image 120 is shown in FIG. 2, in the middle. The flood image 120 may not comprise any reflection features generated by the illumination pattern. The flood image itself may comprise pixels, the pixels of the image correlating to pixels of the matrix of the sensor element. The flood image 120 may be at least one two-dimensional image. The flood image 120 may be an RGB (red green blue) image. The imaging at least one flood image 120 may comprise capturing and/or recording the flood image 120. The evaluation device 132 of the detector 144 is configured for evaluating the flood image thereby determining reflectance R(x) for each pixel position x of the flood image 120. The reflectance may be determined by determining a ratio of energy reflected to the total energy incident on the scene. Therefore, the evaluation device 132 may be configured for determining an intensity value for each pixel. The reflectance may be assumed to be Lambertian reflectance.

The camera 122 is configured for imaging the at least one pixelated reflection image 128. An example, of the reflection image 12 is shown in FIG. 2, left side. The reflection image 128 comprises a plurality of reflection features generated by the scene in response to the illumination pattern. Each of the reflection features comprises at least one beam profile, also denoted reflection beam profile. The beam profile of the reflection feature may be at least one intensity distribution of the reflection feature as a function of the pixel. The beam profile may be selected from the group consisting of a trapezoid beam profile; a triangle beam profile; a conical beam profile and a linear combination of Gaussian beam profiles.

Thus, the setup of the detector 144 as shown in FIG. 3 may comprise the camera 122, a laser projector 126 and a flood light source 116. The camera 122 may capture two images. One image may comprise the scene illuminated only by the laser projector 126. This is the resulting laser frame. The other image may comprise only the scene illuminated by the flood light source 116. This is the flood frame.

The evaluation device 132 is configured for evaluating the reflection image 128. The evaluation comprises, for each reflection feature, determining depth information by analysis of its respective beam profile and determining at least one physical light property A(x) for the respective pixel position x of the reflection image 128.

The evaluation of the reflection image 128 may comprise identifying the reflection features of the reflection image. The evaluation device 132 may be configured for performing at least one image analysis and/or image processing in order to identify the reflection features. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a blob detector; applying a corner detector; applying a Determinant of Hessian filter; applying a principle curvature-based region detector; applying a maximally stable extremal regions detector; applying a generalized Hough-transformation; applying a ridge detector; applying an affine invariant feature detector; applying an affine-adapted interest point operator; applying a Harris affine region detector; applying a Hessian affine region detector; applying a scale-invariant feature transform; applying a scale-space extrema detector; applying a local feature detector; applying speeded up robust features algorithm; applying a gradient location and orientation histogram algorithm; applying a histogram of oriented gradients descriptor; applying a Deriche edge detector; applying a differential edge detector; applying a spatio-temporal interest point detector; applying a Moravec corner detector; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing a feature within the image.

The evaluation device 132 may be configured for performing at least one image correction. The image correction may comprise at least one background subtraction. The evaluation device 132 may be adapted to remove influences from background light from the beam profile, for example, by an imaging without further illumination.

The evaluation device 132 may be configured for determining the beam profile of the respective reflection feature. The determining the beam profile may comprise identifying at least one reflection feature of the reflection image 128 and/or selecting at least one reflection feature of the reflection image 128 and evaluating at least one intensity distribution of the reflection feature. As an example, a region of the matrix may be used and evaluated for determining the intensity distribution, such as a three-dimensional intensity distribution or a two-dimensional intensity distribution, such as along an axis or line through the matrix. As an example, a center of illumination by the light beam may be determined, such as by determining the at least one pixel having the highest illumination, and a cross-sectional axis may be chosen through the center of illumination. The intensity distribution may an intensity distribution as a function of a coordinate along this cross-sectional axis through the center of illumination. Other evaluation algorithms are feasible.

The reflection feature may cover or may extend over at least one pixel of the reflection image 128. For example, the reflection feature may cover or may extend over plurality of pixels. The evaluation device 132 may be configured for determining and/or for selecting all pixels connected to and/or belonging to the reflection feature, e.g. a light spot. The evaluation device 132 may be configured for determining the center of intensity by $$R_{coi} = \frac{1}{l \cdot \Sigma j \cdot r_{pixel}},$$

wherein $R_{coi}$ is a position of center of intensity, $r_{pixel}$ is the pixel position and $l=\Sigma_j I_{total}$ with j being the number of pixels j connected to and/or belonging to the reflection feature and $I_{total}$ being the total intensity.

The laser frame may be evaluated by so called "beam profile analysis", also called depth-from-photon-ratio technique. With respect to depth-from-photon-ratio (DPR) technique reference is made to WO 2018/091649 A1, WO 2018/091638 A1 and WO 2018/091640 A1, the full content of which is included by reference. The named references refer to embodiments of how to determine a combined signal Q, also denoted as quotient Q, from at least one of the reflection features and determining the depth information therefrom using at least one predetermined relationship between the combined signal Q and the longitudinal coordinate.

The evaluation device 132 is configured for determining depth information for each of the reflection features by analysis of its respective beam profile. Thus, the evaluation device 132 may be configured for determining at least one longitudinal coordinate $z_{DPR}$ for each of the reflection features by analysis of its respective beam profile.

The evaluation device 132 may be configured for executing at least one algorithm which computes distances for all reflection features with zero order and higher order. The method may comprise determining the at least one depth level from the depth information of said reflection features by using the evaluation device 132. The evaluation device 132 may be configured for determining a first depth map of from the depth information of the reflection features. The first depth map may be a thinly filled depth map comprising a few entries. Alternatively, the depth may be crowded comprising a large amount of entries.

The evaluation device 132 is configured for determining at least one physical light property A(x) for the respective pixel position x of the reflection image 128. The physical light property A(x) may be one or more of reflectance or albedo. Thus, step d) may yield depth information and light physical quantities of each reflection feature, e.g. each laser spot.

The evaluation device 132 is configured for assigning, for each reflection feature, the determined depth information and the determined physical light property A(x) to a corresponding pixel of the flood image and extrapolating 140 the determined depth information and the determined physical light property A(x) to similar pixels of the flood image 120 around said corresponding pixel.

The method may comprise at least one calibration step, wherein the calibration step comprises determining a position of the projector 126. Thus, the position of the projector 126 may be known. Therefore, physical light properties such as reflectance or albedo can be estimated.

The information determined in step d) would be only available on the spot's positions itself. The present invention, as depicted in the images of FIG. 2, proposes to extrapolate the information around the spot positions, see reference number 140. From left to right, FIG. 2 shows a pixel of an identified reference feature of the reflection image 128, the corresponding pixel in the flood image 120 and the extrapolation to similar pixels. The flood image 120 may be used for assign the information in a meaningful way. It can be assumed that similar pixels in the flood image 120 have similar spot information. The pixels around said corresponding pixel may be neighboring pixels. The pixel area may be predefined and/or may be selected by the evaluation device 132. As outlined above, the evaluation device 132 may be configured for determining and/or for selecting all pixels connected to and/or belonging to the reflection feature. In this area the similar pixels may be used. The pixel area may be circular or rectangular around the corresponding pixel which may be positioned in a center. Other shapes of the pixel area are possible. The pixel area may be selected depending on determined depth information and/or resolution and the like. The extrapolation may be performed reflection feature wise, i.e. piecewise for each laser spot of the point cloud. By extrapolating the information it may be possible to change the representation of the spot information from a spare spot list to a dense pixel map.

The evaluation device 132 is configured for determining the depth map by using a shape-from-shading technique considering the determined reflectance R(x), the determined depth information and the determined physical light property A(x). The evaluation device 132 may be configured for reconstructing the surface of the object 110. The determined reflectance R(x), the determined depth information and the determined physical light property A(x) may be used for surface reconstruction of the object using shape-from-shading. In case the light direction of the flood light source is known, the depth map can be refined using a shape-from-shading approach. With respect for shape-from-shading reference is made to B. Horn, "Obtaining shape from shading information", in P. Winston, editor, The Psychology of Computer Vision, McGraw-Hill, New York, 1975.

The reflectance is known from the flood image. In addition, the physical light property A(x), in particular the albedo, was determined as described above using the extrapolation. This may allow to determine the implicit given normal field n, i.e.

$R(x)=A(x)\langle n(x),I(x)\rangle$, where x is the pixel position in the image and I(x) is the light direction of the flood light source. The normal field is used to refine the depth map of the beam profile analysis.

Several shape-from-shading techniques are known by the skilled person such as minimization approaches. However, other approach may be used, too.

For example, a variational method may be used. The determining of the depth map in step f) comprises solving at least one optimization problem thereby determining a normal map n(x), wherein the optimization problem is given by $$\int \|R(x)-A(x)\langle n(x),I(x)\rangle\|^2+\lambda\|\nabla n\|^2 dx \to \min,$$

wherein $\lambda$ is a constant and I(x) is the light direction of the flood light source. The normal map n(x) is a distribution of surface normal as a function of pixel position x, wherein the surface normal is the orientation of a vector perpendicular to a tangent plane on a surface of the object.

This optimization problem yields a normal map n(x). Additionally, a depth map is given. The normal information can be determined by the derivatives of the depth map, i.e.

$$n = \begin{pmatrix} -\nabla z \\ 1 \end{pmatrix} \cdot \frac{1}{\sqrt{1+\|\nabla z\|^2}}$$

The Poisson surface reconstruction may be performed as described in M. Kazhdan, M. Bolitho and H. Hoppe, "Poisson Surface Reconstruction", Eurographics Symposium on Geometry Processing (2006). The derivation to z can be determined from the normal map n, i.e $$\nabla z = -\frac{n_x}{n_z}.$$

wherein $n_x$ are the first two components of n and $n_z$ is the third component. Applying the divergence of the gradient field yields the Poisson equation $$\Delta z = \nabla \cdot \nabla z = -\nabla\left(\frac{n_x}{n_z}\right).$$

Solving the Poisson equation allows to find a depth map that is close to the desired normal map.

LIST OF REFERENCE NUMBERS 110 object
112 step a
114 scene
116 flood light source
118 light direction
120 flood image
122 camera
124 step b)
126 projector
128 reflection image
130 step c)
132 evaluation device
134 step d)
136 step e)
138 assigning
140 extrapolating
142 step f)
144 detector
146 coordinate system
148 optical axis
150 housing
152 Transfer device

The invention claimed is:

1. A method for determining a depth map of at least one object, wherein the method comprises the following steps:
   a) illuminating a scene comprising the object by using at least one flood light source, wherein the illumination from the flood light source has a predefined and/or predetermined light direction, imaging at least one pixelated flood image of the scene by using at least one camera;
   b) projecting at least one illumination pattern on the scene by using at least one projector and imaging at least one pixelated reflection image using the camera, wherein the reflection image comprises a plurality of reflection features generated by the scene in response to the illumination pattern, wherein each of the reflection features comprises a beam profile;
   c) evaluating the flood image by using at least one evaluation device thereby determining reflectance R(x) for each pixel position x of the flood image;
   d) evaluating the reflection image by using the evaluation device, wherein the evaluation comprises, for each reflection feature, determining depth information by analysis of its respective beam profile and determining at least one physical light property A(x) for the respective pixel position x of the reflection image;
   e) the evaluation device, assigning, for each reflection feature, the determined depth information and the determined physical light property A(x) to a corresponding pixel of the flood image and extrapolating the determined depth information and the determined physical light property A(x) to similar pixels of the flood image around said corresponding pixel; and
   f) the evaluation device, determining the depth map by using a shape-from-shading technique considering the determined reflectance R(x), the determined depth information and the determined physical light property A(x).

2. The method according to claim 1, wherein the determining of the depth map in step f) comprises solving at least one optimization problem thereby determining a normal map n(x), wherein the optimization problem is given by $$\int \|R(x)-A(x)\langle n(x),l(x)\rangle\|^2+\lambda\|\nabla n\|^2 dx \to \min,$$

wherein $\lambda$ is a constant and l(x) is the light direction of the flood light source.

3. The method according to claim 2, wherein the normal map n(x) is a distribution of surface normal as a function of pixel position x, wherein the surface normal is the orientation of a vector perpendicular to a tangent plane on a surface of the object.

4. The method according to claim 2, wherein the determining of the depth map in step f) comprises determining the depth map z from the normal map n(x) by solving the Poisson equation $$\Delta z = \nabla \cdot \nabla z = -\nabla\left(\frac{n_x}{n_z}\right),$$

wherein $n_x$ are the first two components of n and $n_z$ is the third component.

5. The method according to claim 1, wherein the determining of the depth map in step f) comprises determining the depth map z from the normal map n(x) by solving the Poisson equation $$\Delta z = \nabla \cdot \nabla z = -\nabla \left( \frac{n_x}{n_z} \right),$$

wherein $n_x$ are the first two components of n and $n_z$ is the third component.

6. The method according to claim 1, wherein the physical light property A(x) is one or more of reflectance or albedo.

7. The method according to claim 1, wherein the flood light source comprises at least one light-emitting-diode (LED).

8. The method according to claim 1, wherein the projector comprises at least one laser light source, wherein the illumination pattern comprises a grid of laser spots.

9. The method according to claim 8, wherein the illumination pattern comprises a triangular pattern, a hexagonal pattern, a rectangular pattern, a pattern comprising convex uniform tilings, a line pattern comprising at least one line, a line pattern comprising at least two lines, a line pattern comprising at least two parallel lines, or a line pattern comprising at least two crossing lines.

10. The method according to claim 8, wherein the illumination pattern comprises a pseudo-random point pattern; a random point pattern or a quasi random pattern.

11. The method according to claim 8, wherein the laser spots have wavelengths in a near infrared (NIR) regime.

12. The method according to claim 11, wherein the laser spots have a wavelength of 780 nm to 3.0 μm.

13. The method according to claim 1, wherein the camera comprises at least one pixelated camera chip, wherein the camera comprises at least one CCD chip and/or at least one CMOS chip.

14. The method according to claim 1, wherein the camera is or comprises at least one near infrared camera.

15. The method according to claim 1, wherein the method comprises at least one calibration step, wherein the calibration step comprises determining a position of the projector.

16. The method according to claim 1, wherein the evaluation device is adapted to remove influences from background light from the beam profile.

17. The method according to claim 1, wherein the evaluation device is configured for determining depth information for each of the reflection features by analysis of its respective beam profile.

18. A detector comprising
at least one flood light source configured for illuminating a scene comprising at least one object, wherein the illumination from the flood light source has a predefined and/or predetermined light direction,
at least one projector configured for projecting at least one illumination pattern on the scene;
at least one camera configured for imaging at least one pixelated flood image of the scene and for imaging at least one pixelated reflection image, wherein the reflection image comprises a plurality of reflection features generated by the scene in response to the illumination pattern, wherein each of the reflection features comprises a beam profile; and
at least one evaluation device configured for evaluating the flood image thereby determining reflectance R(x) for each pixel position x of the flood image, wherein the evaluation device is configured for evaluating the reflection image, wherein the evaluation comprises, for each reflection feature, determining depth information by analysis of its respective beam profile and determining at least one physical light property A(x) for the respective pixel position x of the reflection image, wherein the evaluation device is configured for assigning, for each reflection feature, the determined depth information and the determined physical light property A(x) to a corresponding pixel of the flood image and extrapolating the determined depth information and the determined physical light property A(x) to similar pixels of the flood image around said corresponding pixel, wherein the evaluation device is configured for determining the depth map by using a shape-from-shading technique considering the determined reflectance R(x), the determined depth information and the determined physical light property A(x).

19. The detector according to claim 18, wherein the detector is configured for performing a method comprising the following steps:
a) illuminating a scene comprising the object by using at least one flood light source, wherein the illumination from the flood light source has a predefined and/or predetermined light direction, imaging at least one pixelated flood image of the scene by using at least one camera;
b) projecting at least one illumination pattern on the scene by using at least one projector and imaging at least one pixelated reflection image using the camera, wherein the reflection image comprises a plurality of reflection features generated by the scene in response to the illumination pattern, wherein each of the reflection features comprises a beam profile;
c) evaluating the flood image by using at least one evaluation device thereby determining reflectance R(x) for each pixel position x of the flood image;
d) evaluating the reflection image by using the evaluation device, wherein the evaluation comprises, for each reflection feature, determining depth information by analysis of its respective beam profile and determining at least one physical light property A(x) for the respective pixel position x of the reflection image;
e) the evaluation device, assigning, for each reflection feature, the determined depth information and the determined physical light property A(x) to a corresponding pixel of the flood image and extrapolating the determined depth information and the determined physical light property A(x) to similar pixels of the flood image around said corresponding pixel; and
f) the evaluation device, determining the depth map by using a shape-from-shading technique considering the determined reflectance R(x), the determined depth information and the determined physical light property A(x).

20. The detector according to claim 18, wherein the flood light source and the projector emit light at a wavelength of 780 nm to 3.0 μm.

21. The detector according to claim 18, wherein the projector comprises at least one laser light source.

22. The detector according to claim 18, wherein the camera comprises at least one pixelated camera chip, wherein the camera comprises at least one CCD chip and/or at least one CMOS chip.

23. The detector according to claim 18, wherein the camera is or comprises at least one near infrared camera.

24. The detector according to claim 18, wherein the detector is part of a position measurement system for traffic technology.

25. A computer program, stored on a non-transitory computer-readable medium, for determining a depth map configured for causing a computer or a computer network to fully or partially perform the method according to claim 1, when executed on the computer or the computer network, wherein the computer program is configured for performing and/or executing at least steps c) to f).

* * * * *